(12) United States Patent
Leung

(10) Patent No.: US 7,660,107 B2
(45) Date of Patent: Feb. 9, 2010

(54) HDD ANTI-SHOCK AND ANTI-VIBRATION DEVICE

(75) Inventor: Sam Leung, Shenzhan (CN)

(73) Assignee: ESGW Holdings Limited, Tortola (VG)

( * ) Notice: Subject to any disclaimer, the term of this patent is extended or adjusted under 35 U.S.C. 154(b) by 0 days.

(21) Appl. No.: 11/986,818

(22) Filed: Nov. 27, 2007

(65) Prior Publication Data

US 2009/0135556 A1 May 28, 2009

(51) Int. Cl.
*G06F 1/16* (2006.01)

(52) U.S. Cl. .............. 361/679.36; 361/679.33; 361/679.34; 312/223.1; 312/223.2

(58) Field of Classification Search .......... 361/684, 361/685, 690, 679.33, 679.34, 679.36; 312/223.1, 312/223.2
See application file for complete search history.

(56) References Cited

U.S. PATENT DOCUMENTS

| | | | | |
|---|---|---|---|---|
| 4,677,809 A | * | 7/1987 | Long et al. .............. 53/427 |
| 5,405,000 A | * | 4/1995 | Hagedon et al. ............ 206/216 |
| 5,426,562 A | * | 6/1995 | Morehouse et al. ......... 361/685 |
| 5,837,934 A | * | 11/1998 | Valavanis et al. ........... 174/544 |
| 6,154,360 A | | 11/2000 | Kaczeus, Sr. et al. |
| 6,339,532 B1 | | 1/2002 | Boulay et al. |
| 6,351,374 B1 | | 2/2002 | Sherry |
| 6,487,039 B1 | * | 11/2002 | Bernett ................... 360/97.02 |
| 6,619,481 B2 | * | 9/2003 | Merrell et al. ............... 206/721 |
| 7,009,835 B2 | | 3/2006 | Desai et al. |
| 7,012,805 B2 | | 3/2006 | Shah et al. |
| 2002/0097556 A1 | * | 7/2002 | Lee ........................... 361/685 |
| 2005/0007733 A1 | * | 1/2005 | Byun et al. ................ 361/685 |
| 2005/0168935 A1 | * | 8/2005 | Inoue et al. ................ 361/685 |
| 2006/0289615 A1 | * | 12/2006 | Cardinale .............. 229/117.32 |
| 2007/0008697 A1 | * | 1/2007 | Choi et al. ................... 361/685 |
| 2007/0030646 A1 | * | 2/2007 | Hsu .......................... 361/687 |
| 2008/0024972 A1 | * | 1/2008 | Yamaguchi ................ 361/685 |
| 2008/0101008 A1 | * | 5/2008 | Ulrich et al. ................ 361/685 |

* cited by examiner

*Primary Examiner*—Jayprakash N Gandh
*Assistant Examiner*—Anthony Q Edwards
(74) *Attorney, Agent, or Firm*—Saile Ackerman LLC; Stephen B. Ackerman; Rosemary L. S. Pike

(57) ABSTRACT

A Hard Disk Drive anti-shock and anti-vibration device and a Data Storage Device consisting of a HDD and the HDD anti-shock and anti-vibration device are described. The HDD anti-shock and anti-vibration device includes a packaging paper and foam. The foam is adhered on the packaging paper. When this packaging paper, with the foam adhering onto it, is folded, it can wrap the HDD in the foam. This HDD anti-shock and anti-vibration device can prevent the HDD from damage when the HDD is accidentally dropped or bumped and has excellent anti-shock and anti-vibration effects.

19 Claims, 3 Drawing Sheets

HDD ANTI-SHOCK AND ANTI-VIBRATION DEVICE

BACKGROUND OF THE INVENTION (1) Field of the Invention

The invention relates to a hard disk drive anti-shock and anti-vibration device, and more particularly, to a data storage device consisting of a hard disk drive and a hard disk drive anti-shock and anti-vibration device.

(2) Description of the Related Art

As technology advances, it is increasingly important to properly store and transfer information. At present, this information storage and transfer are often carried out using a hard disk drive (HDD), especially Mobile HDD's. This is because a HDD has large capacity and fast data transfer, two important advantages compared to other data storage products. However, since Mobile HDD's will be moved around during usage, they can easily be dropped or bumped. This will cause damage to the HDD and, hence, the loss of important information or data stored in it.

U.S. Pat. No. 6,154,360 to Kacseus, Sr. et al shows a foam enclosure in a shock resistant module housing for a hard disk drive. U.S. Pat. No. 6,351,374 to Sherry discloses insulator foam or other resilient material around a HDD to reduce shock. U.S. Pat. No. 6,339,532 (Boulay et al) describes mounting plates of a viscoelastic material having aligned ventilation holes for cooling. U.S. Pat. No. 7,009,835 (Desai et al) discloses an elastic envelope that holds open-cell foam, a viscous liquid, and a compressible gas around a HDD. U.S. Pat. No. 7,012,805 (Shah et al) says that a portable disk drive should be able to survive multiple drops of 36" onto a hard surface.

SUMMARY OF THE INVENTION

A principal object of the present invention is to provide a cost-effective and very manufacturable method of overcoming the loss of data problem when a HDD is either dropped or bumped.

Another object of the invention is to provide a HDD anti-shock and anti-vibration device.

A further object of the invention is to provide a Data Storage Device consisting of a HDD and a HDD anti-shock and anti-vibration device.

In accordance with the objects of this invention, a HDD anti-shock and anti-vibration device is achieved. The HDD anti-shock and anti-vibration device consists of a packaging paper and a foam wherein the foam is adhered onto the packaging paper. The HDD can be wrapped in the foam as the packaging paper is folded.

BRIEF DESCRIPTION OF THE DRAWINGS

In the accompanying drawings forming a material part of this description, there is shown.

DESCRIPTION OF THE PREFERRED EMBODIMENTS

Figure 1A:
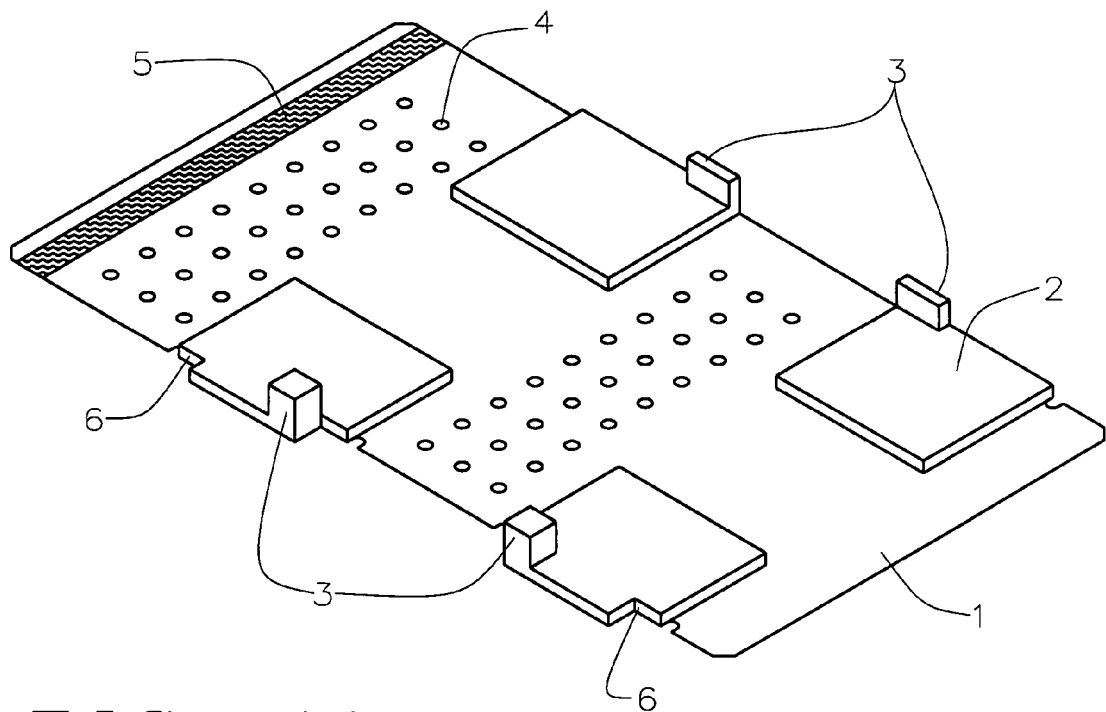
FIGS. 1A-1C schematically illustrate in top view the packaging paper and alternate foams of the present invention.
Figure 1B:
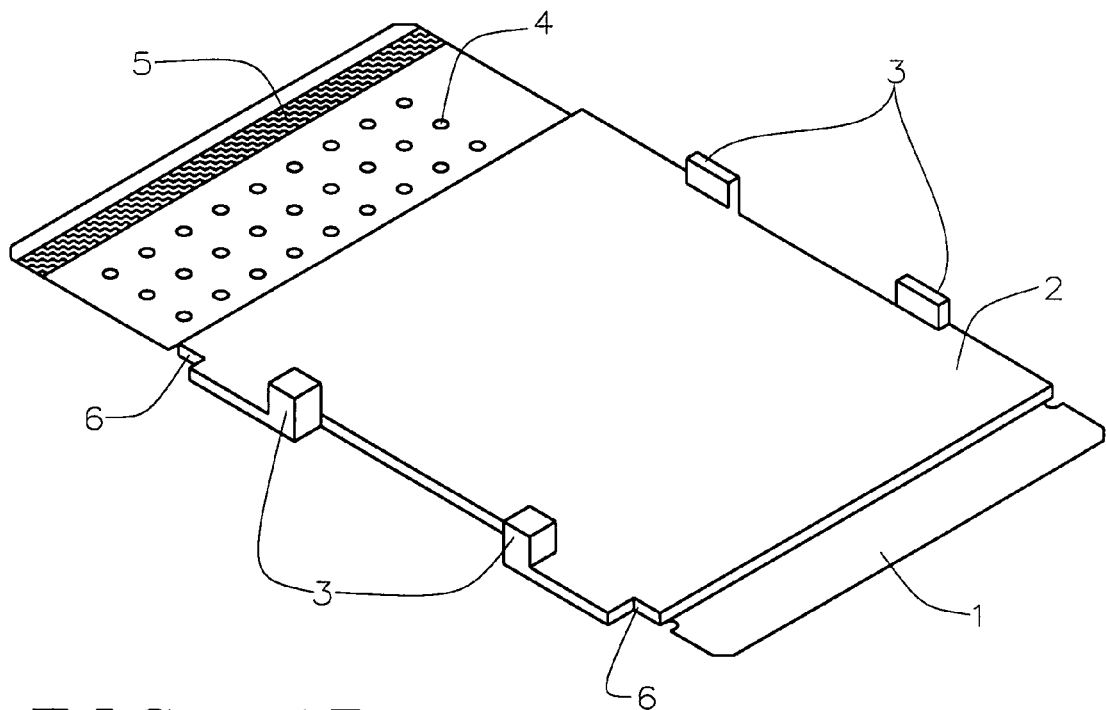
Figure 1C:
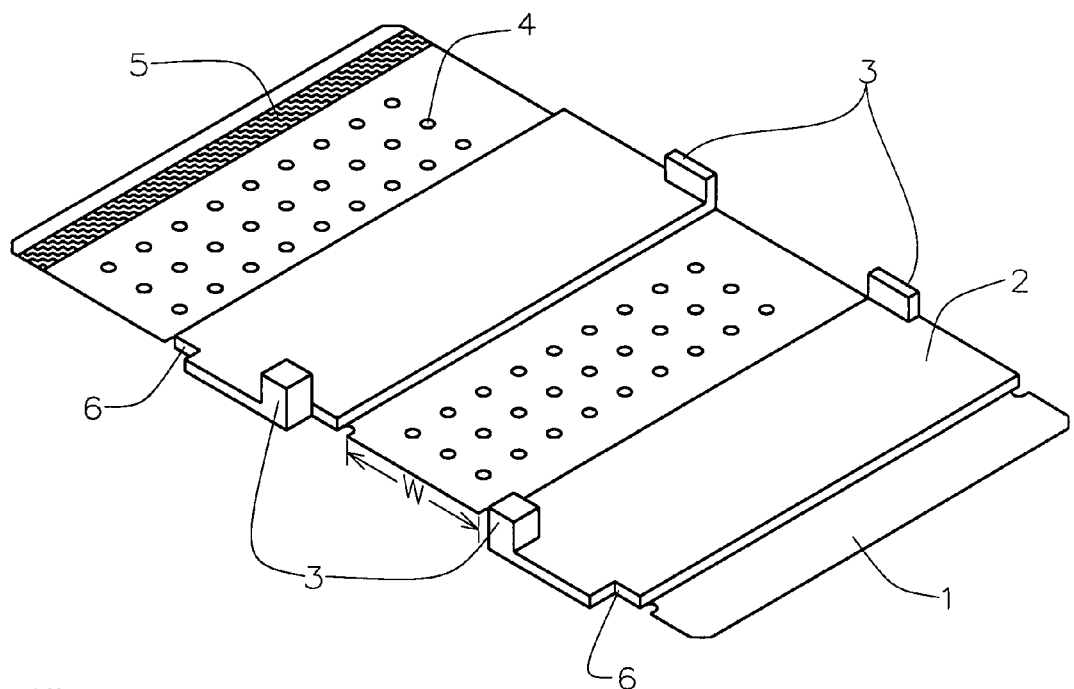
Figure 2A:
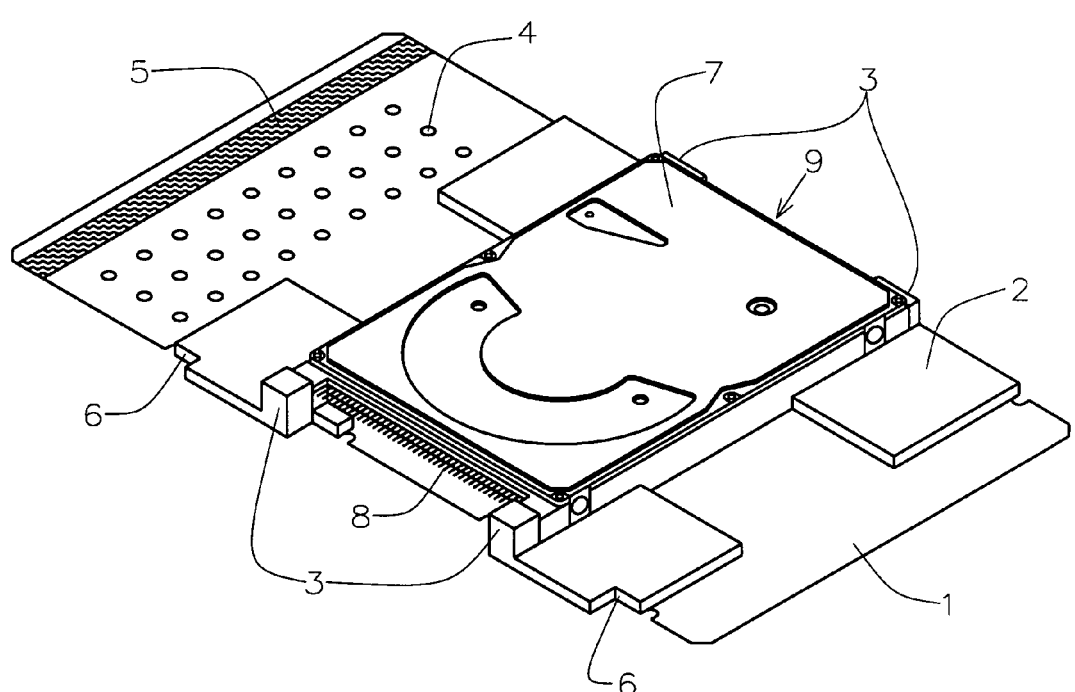
FIGS. 2A and 2B schematically illustrate in top view the packaging paper and foam of the present invention wherein a hard disk drive is placed on the packaging paper.
Figure 2B:
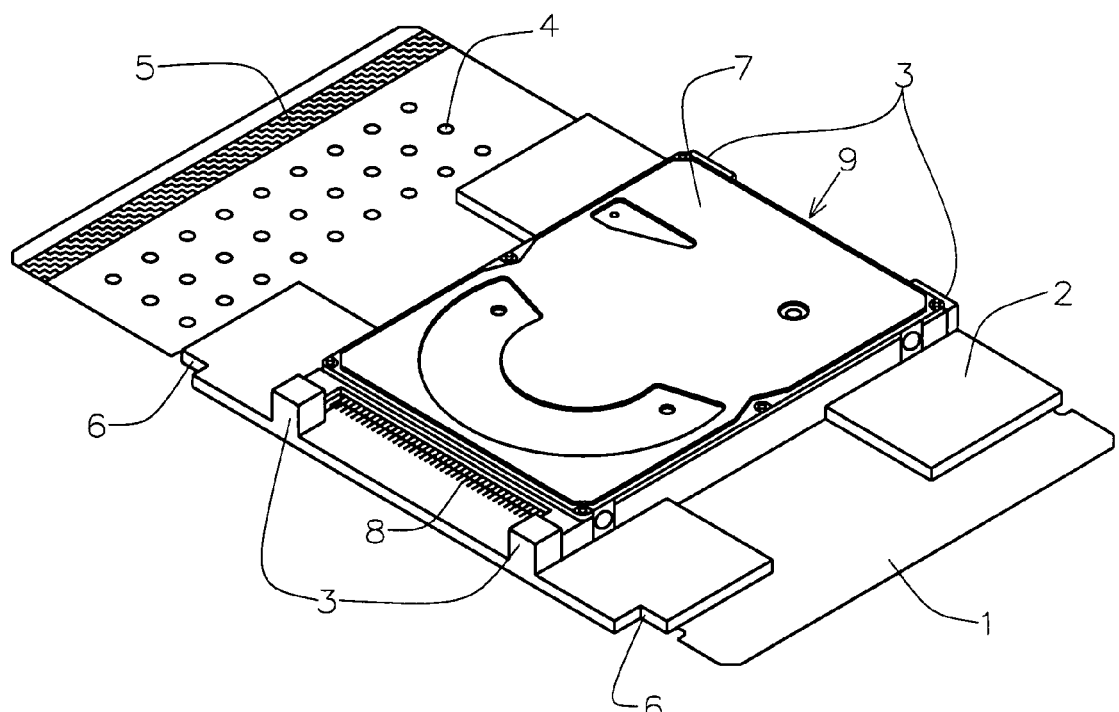
Figure 3:
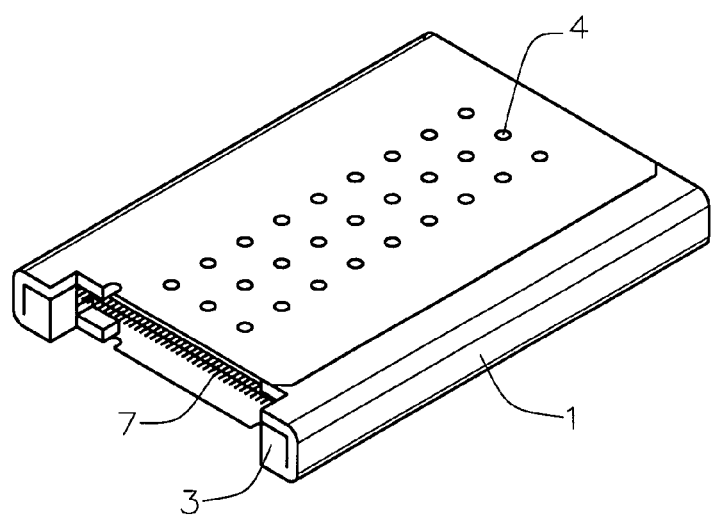
FIG. 3 schematically illustrates in top view a hard disk drive wrapped in the packaging paper of the present invention.

The hard disk drive (HDD) anti-shock and anti-vibration device of the present invention consists of a packaging paper and foam. FIGS. 1A-C illustrate a top view of the packaging paper 1 of the present invention. Alternate configurations of the foam 2 are shown in FIGS. 1A-1C. The foam 2 is adhered onto the packaging paper. As shown in FIGS. 2A, 2B, and 3, a HDD 7 can be wrapped in the foam 2 as the packaging paper 1 is folded.

The packaging paper 1 has heat ventilation holes 4 on areas that are not adhered with foam 2. As the HDD is wrapped by the packaging paper 1, the heat ventilation holes 4 are placed on the center areas of the HDD 7 top and bottom surfaces.

FIGS. 1A-1C and 2 illustrate molded protrusions 3 on the foam 2. As the HDD 7 is wrapped by the packaging paper 1, the vertical protrusions 3 will restrain the HDD from moving from front and back sides. As the HDD is placed on the packaging paper 1, as shown in FIGS. 2A and 2B, the vertical protrusions 3 are positioned closely to and touch the front side of the HDD. The vertical protrusions 3 on the back side of the HDD are two vertical protrusions that are placed close to and touch the back side of the HDD. As the HDD is wrapped by the packaging paper 1, the foam 2 wraps on top of the HDD and the vertical protrusions are placed to match the cutouts 6 on the foam 2, as shown in FIG. 3.

The HDD anti-shock and anti-vibration device of the present invention utilizes the foam as the anti-shock and anti-vibration material. For example, the foam may comprise Poron® microcellular urethane foam by Rogers Corporation. The foam has good anti-shock and anti-vibration effects. It is also simple and easy to use the packaging paper to wrap the HDD with the foam. Especially with the heat ventilation holes on the area of the packaging paper where there is no foam adhered to it, the heat generated by the HDD during operation can be ventilated out. The heat ventilation effect can be greatly increased with the ventilation holes placed on the center areas of the top and bottom surfaces of the HDD.

The protrusions 3 on the foam 2 could prevent the HDD 7 from slipping out from the HDD anti-shock and anti-vibration device when the HDD is subjected to shock and vibration. It could also enhance the anti-shock and anti-vibration effect at both the front and back ends of the HDD. The vertical square protrusions 3 in front and in back of the HDD can further improve the HDD protection reliability.

The present invention also includes a Data Storage Device, which is a HDD with the above-described anti-shock and anti-vibration characteristics.

Method of Implementation

In more detail, with reference to the FIGS. 1A-1C, 2A, 2B, and 3, the packaging paper 1 is adhered with the foam 2. At the end of the packaging paper, there is a strip of connection section 5. Such connection section can be a double-sided adhesive tape, Velcro strip, or some kind of connecting button/buckle that can tightly connect two loose ends of the packaging paper. As such, the HDD is placed on the foam 2 of the packaging paper 1, the packaging paper 1 is wrapped over the HDD 7, and the connection section 5 of the packaging paper will tie the two ends together. The HDD 7 is wrapped inside the foam 2 to prevent damage from drops. Preferably the paper is treated so that it self-extinguishes if it catches fire.

Foam 2 can be a one-piece structure, as shown in FIG. 1B. Or foam 2 can be two pieces separated by a certain distance W (smaller than the width of the HDD), as shown in FIG. 1C. To save materials, as shown in FIG. 1A, the foam can be divided into four pieces where the four pieces are placed at the four corners of the hard disk drive.

There are heat ventilation holes 4 on the packaging paper where not covered by foam 2. When the HDD is wrapped in the packaging paper, the heat generated during the operation of the HDD can be ventilated through these holes 4. When the HDD is wrapped in the packaging paper, the ventilation holes are placed on the center areas of the top and bottom surfaces of the HDD. This can improve the heat ventilation effect. In the case of the one-piece foam in FIG. 1B, the ventilation holes will be placed only on the top or the bottom of the HDD. Circular holes of one-eighth an inch in diameter are preferred. It is preferred to have as many holes as possible.

On the foam, corresponding to the connector end 8 and the back end 9 of the HDD 7, there are protrusions 3. These protrusions on the foam will restrain the HDD from moving when wrapped in the packaging paper and also provide additional anti-shock and anti-vibration effects. The protrusions on the foam at the front end 8 of the HDD may cover the whole front end of the HDD below the HDD connector (if there is room), as shown in FIG. 2B. Or, as shown in FIG. 2A, the protrusions can be located at the two ends of the front side of the HDD. The height of the two vertical protrusions can be equal to or a little higher than the height of the HDD. There are cutouts on the opposite sides of the foam that match these two protrusions when the foam is wrapped around the HDD. The protrusion of this structure will provide better support strength of the HDD. This same foam structure, as illustrated in FIG. 2A or 2B for the front end, can also be used at the back end of the HDD.

The implementation of this invention utilizes the packaging paper and foam for the purpose of anti-shock and anti-vibration for the HDD. It has good anti-shock and anti-vibration effects and it is also easy to assemble. The heat ventilation holes on the packaging paper will effectively ventilate the heat generated during the operation of the HDD. The protrusions on the foam will not only prevent the HDD from slipping out of the anti-shock and anti-vibration device, but also will provide additional anti-shock and anti-vibration effects.

The Data Storage Device of the present invention comprises a HDD and a HDD anti-shock and anti-vibration device. The anti-shock and anti-vibration device comprises a packaging paper to which is adhered a foam. The HDD is wrapped in the packaging paper so that the foam holds the HDD in place and provides anti-shock and anti-vibration protection. Ventilation holes in the packaging paper cool the HDD during operation.

While the invention has been particularly shown and described with reference to the preferred embodiments thereof, it will be understood by those skilled in the art that various changes in foam and details may be made without departing from the spirit and scope of the invention.

What is claimed is:

1. A hard disk drive anti-shock and anti-vibration device comprising:
    a packaging paper;
    a foam wherein said foam is adhered on only an inside surface of said packaging paper and wherein a hard disk drive is wrapped by said packaging paper in said foam; and a strip of adhesion area on said packaging paper wherein when said hard disk drive is wrapped in said packaging paper, said strip of adhesion area adheres both ends of said packaging paper together.

2. The hard disk drive device according to claim 1 further comprising:
    heat ventilation holes on areas of said packaging paper that is not adhered with said foam.

3. The hard disk drive device according to claim 2 wherein when said hard disk drive is wrapped by said packaging paper, said heat ventilation holes are placed on center areas of said hard disk drive top or bottom surfaces or both top and bottom surfaces.

4. The hard disk drive device according to claim 1 further comprising vertical protrusions or tabs on said foam wherein when said hard disk drive is wrapped by said packaging paper, said vertical protrusions or tabs will restrain said hard disk drive from moving from front and back sides.

5. The hard disk drive device according to claim 4 wherein:
    said vertical protrusions or tabs on a front end of said hard disk drive are two vertical protrusions that are positioned closely to and touch said front side of said hard disk drive; and
    when said hard disk drive is wrapped by said packaging paper, said foam wraps on top of said hard disk drive and said vertical protrusions are placed to match cutouts on said foam.

6. The hard disk drive device according to claim 4 wherein:
    said vertical protrusions or tabs on a back side of said hard disk drive are two vertical protrusions that are placed close to and touch said back side of said hard disk drive.

7. The hard disk drive device according to claim 1 wherein said foam comprises one piece on said packaging paper.

8. The hard disk drive according to claim 1 wherein said foam comprises two pieces on said packaging paper wherein said two pieces are separated by an area having a width less than the width of said hard disk drive.

9. The hard disk drive according to claim 1 wherein said foam comprises four pieces wherein said four pieces are placed at each of four corners of said hard disk drive.

10. A data storage device comprising:
    a hard disk drive; and
    a hard disk drive anti-shock and anti-vibration device comprising:
        a packaging paper;
        a foam wherein said foam is adhered on only an inside surface of said packaging paper; and
        a strip of adhesion area on said packaging paper wherein when said hard disk drive is wrapped in said packaging paper, said strip of adhesion area adheres both ends of said packaging paper together.

11. The data storage device according to claim 10 further comprising:
    heat ventilation holes on areas of said packaging paper that is not adhered with said foam.

12. The data storage device according to claim 11 wherein when said hard disk drive is wrapped by said packaging paper, said heat ventilation holes are placed on center areas of said hard disk drive top or bottom surfaces or both top and bottom surfaces.

13. The data storage device according to claim 10 further comprising vertical protrusions or tabs on said foam wherein when said hard disk drive is wrapped by said packaging paper, said vertical protrusions or tabs will restrain said hard disk drive from moving from front and back sides.

14. The data storage device according to claim 13 wherein:
said vertical protrusions or tabs on a front end of said hard disk drive are two vertical protrusions that are positioned closely to and touch said front side of said hard disk drive; and
when said hard disk drive is wrapped by said packaging paper, said foam wraps on top of said hard disk drive and said vertical protrusions are placed to match cutouts on said foam.

15. The data storage device according to claim 13 wherein:
said vertical protrusions or tabs on a back side of said hard disk drive are two vertical protrusions that are placed close to and touch said back side of said hard disk drive.

16. The data storage device according to claim 10 wherein said foam comprises one piece on said packaging paper or two pieces on said packaging paper wherein said two pieces are separated by an area having a width less than the width of said hard disk drive.

17. The hard disk drive according to claim 10 wherein said foam comprises four pieces wherein said four pieces are placed at each of four corners of said hard disk drive.

18. A method for providing anti-shock and anti-vibration protection for a hard disk drive comprising:
providing a packaging paper having at least one section comprising a plurality of rows and columns of circular holes;
adhering a foam on only an inside surface of said packaging paper; and
folding said packaging paper thereby wrapping said hard disk drive inside said foam wherein said at least one section comprising circular holes is placed on center areas of said hard disk drive top or bottom surfaces.

19. The method according to claim 18 further comprising:
adhering both ends of said packaging paper together using a strip of adhesion area on said packaging paper.

* * * * *